United States Patent [19]

Kluttz

[11] Patent Number: 5,278,207
[45] Date of Patent: Jan. 11, 1994

[54] ASPHALT AMINE FUNCTIONALIZED POLYMER COMPOSITION

[75] Inventor: Robert Q. Kluttz, Houston, Tex.

[73] Assignee: Shell Oil Company, Houston, Tex.

[21] Appl. No.: 972,401

[22] Filed: Nov. 6, 1992

[51] Int. Cl.$^5$ .............................................. C08L 95/00
[52] U.S. Cl. ...................................... 524/68; 524/60; 524/61; 524/62; 525/54.5; 525/299; 525/382
[58] Field of Search .................. 524/60, 61, 62, 68; 525/54.5, 382, 299

[56] References Cited

U.S. PATENT DOCUMENTS

| | | | |
|---|---|---|---|
| 2,550,476 | 11/1947 | Hersberger | 106/277 |
| 4,011,184 | 3/1977 | van Reijendam et al. | 525/98 |
| 4,701,484 | 10/1987 | Chang et al. | 524/705 |
| 4,738,996 | 4/1988 | Vonk et al. | 524/68 |
| 4,749,622 | 6/1988 | Vonk et al. | 428/489 |
| 4,871,605 | 10/1989 | Pagen et al. | 428/489 |
| 4,994,508 | 2/1991 | Shiraki et al. | 524/68 |
| 5,019,610 | 5/1991 | Sitz et al. | 524/68 |
| 5,189,083 | 2/1993 | Geller et al. | 524/68 |

FOREIGN PATENT DOCUMENTS

| | | |
|---|---|---|
| 812130 | 7/1974 | Belgium . |
| 58-147456A | 9/1983 | Japan . |
| 59-131664A | 7/1984 | Japan . |
| 7907-359 | 4/1981 | Netherlands . |
| 1583740 | 5/1978 | United Kingdom . |
| 1584504 | 5/1978 | United Kingdom . |

Primary Examiner—Paul R. Michl
Assistant Examiner—Olga Asinovsky
Attorney, Agent, or Firm—Donald F. Haas

[57] ABSTRACT

A bituminous composition comprising a bituminous component, a polymer which comprises at least one block of a conjugated diolefin and at least one block of an acrylic monomer such as an alkyl methacrylate and from 0.001 parts to 1 part by weight of a polyfunctional amine having at least two amino groups. An acid or anhydride functionalized conjugated diene block co-polymer may be used in place of the acrylic monomer polymer.

31 Claims, No Drawings

ASPHALT AMINE FUNCTIONALIZED POLYMER COMPOSITION

BACKGROUND OF THE INVENTION

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, frillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance- of asphalt, some only improve the low temperature performance of asphalt, while some lack thermal stability or mixing stability with asphalt.

Since the late 1960s, diene polymer rubbers such as styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

To be suitable for paving materials, the asphalt polymer mixtures should meet the following requirements:

(a) The polymer must be mixable in asphalt and stay mixed during subsequent processing—compatibility. In a modified asphalt composition, compatibility is important. The polar asphaltene fraction of the asphalt is generally incompatible with the polymer and phase separates over time. This phase separation leads to a serious deterioration in physical properties.

(b) The mixture must have the right rheological (flow) properties to prevent rutting which is the permanent deformation of a road caused by repetitive traffic loads. Viscosity is important but elasticity is the most important aspect since the material must be able to recover rather than just resist deformation. This characteristic is most important in warm climates.

(c) The mixture must have good low temperature properties, i.e. resistance to cracking. As a road cools, stresses develop because it cannot shrink uniformly and eventually this will cause cracking. Traffic-caused stresses also contribute. The polymer will lower the temperature at which cracking will occur. This characteristic is more important in cold climates.

(d) Temperature susceptibility of a polymer modified asphalt is a major consideration. Ideally, one would want a binder (asphalt and polymer) which would be "hard" and elastic at elevated temperatures to resist permanent deformation.

To be suitable for synthetic roofing materials, the asphalt polymer mixtures should meet the following requirements:

(a) sufficient resistance to flow at high temperatures,
(b) sufficient flexibility at low temperatures,
(c) workability according to the conventional methods used in the roofing technique,
(d) adequate hot storage stability,
(e) adequate hardness to prevent deformation during walking on the roof, and
(f) if it is to be used as an adhesive, sufficient adhesion.

British Patent 1,584,504 made bituminous emulsions which were made with an aqueous solution of a polyamine. The emulsion optionally contained a functionalized polymer but the bitumen was modified by functionalizing it with carboxylic acid anhydride groups. The functionalization of asphalt is a difficult and impractical step and is not used commercially.

At the present time, unfunctionalized polymers are being used in paving and roofing applications. Unfunctionalized polymers have certain disadvantages which can cause problems when used in applications such as these. Such disadvantages include undesirably low adhesion to polar materials such as some asphalts, fillers, aggregates, substrates, reinforcing mats, and the like.

SUMMARY OF THE INVENTION

This invention relates to a bituminous composition with improved properties over neat asphalt. The invention is a polymer modified bituminous composition which exhibits better compatibility than previous polymer modified bituminous compositions. The bituminous composition comprises a bituminous component and a functionalized polymer containing at least one conjugated diolefin block and, optionally, a vinyl aromatic hydrocarbon block and, finally, a polyfunctional amine having at least two amino groups. Specific applications of this composition include roofing materials, coatings, hot melt asphalt concrete and sealant compositions.

The polymer may be functionalized by incorporating therein at least one acrylic monomer block or the polymer may be functionalized by grafting onto the polymer backbone acid or anhydride groups. Preferred acid or anhydride groups are those of carboxylic acids. Preferred acrylic monomers are alkyl methacrylates and acrylates. Preferred is a composition comprising from 1 to 45 parts by weight per 100 parts of the bituminous composition of a functionalized block polymer. To this is added from 0.001 to 1 parts by weight of the bituminous composition of the polyfunctional amine.

In one preferred embodiment of the present invention, the bituminous composition contains a block polymer of at least one conjugated diene and at least one acrylic monomer with the structure:

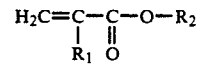

where $R_1$ is hydrogen, phenyl or an alkyl radical which is linear or branched and has from 1 to 10 carbon atoms and $R_2$ is an alkyl radical which has from 1 to 14 carbon atoms, may contain a tertiary amine or an ether linkage and may be a cyclic hydrocarbon.

These polymers are functionalized in that they contain, in the polymer backbone, acrylic, especially methacrylate or acrylate, functionality. This provides the polymer with strongly reactive and interactive chemical groups. An example is t-butyl which has the formula:

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials. Any asphalt may be used but the invention is generally more useful for asphalts with high asphaltene contents, i.e. greater than 12%, because such asphalts are generally incompatible with the polymer component. Asphaltenes are known to those skilled in the art. For purposes of this application, asphaltenes make up the n-heptane insoluble fraction of asphalt.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

Acid functionalized block copolymers which can be used in the present invention are hydrogenated and unhydrogenated block copolymers as described below which have been reacted with various acid functional group-containing molecules. The acid functional group containing molecules which may be reacted with such block copolymers to produce a functionalized block copolymer useful in the present invention include acid or anhydride groups or derivatives thereof. Functionalized polymers containing carboxyl groups reacted onto the vinyl aromatic hydrocarbon block are described in U.S. Pat. No. 4,868,245 which is herein incorporated by reference. The preferred acid monomers for functionalizing the polymers of the present invention are those which can be grafted onto the diene block of the polymer in free radical initiated reactions. Such preferred monomers include acids or anhydrides or derivatives thereof such as carboxylic acid groups and their salts, anhydrides, esters, imide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent. Sulfonic acid functionalized polymers, such as described in U.S. Pat. No. 4,086,171, herein incorporated by reference, may also be used.

The acid functionalized block copolymers utilized should contain from at least 0.2% of the functional groups because this ensures the desired improvement is obtained. Preferably, from 0.5% to 3% of the acid functional groups should be present in the polymer.

Polymers containing backbone functionality which may be used according to the present invention are polymers of conjugated dienes and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,6-dimethylcyclohexyl methacrylate; and acrylates in which the alkyl group contains an ether linkage, such as tetrahydrofuran acrylate. Copolymers containing two or more conjugated dienes are useful herein. Copolymers of conjugated dienes and acrylic monomers with vinyl aromatic monomers are preferred and both random and block copolymers thereof are useful herein. The description which follows is described in terms of block copolymers of conjugated dienes, alkyl methacrylates and vinyl aromatic hydrocarbons but it is applicable also to the other polymers described in this paragraph. This means that this invention encompasses functionalized polymers which are not block copolymers but which incorporate the functionality as described below.

The present invention encompasses polymers which are both high and low in molecular weight, as well as in between. High molecular weight polymers include those up to several million molecular weight as defined by gel permeation chromatography (GPC) peak molecular weight of the main species. Low molecular weight polymers include those of only 1000 molecular weight or even less. In all cases these polymers contain both conjugated dienes and acrylic monomers (alkyl methacrylates). These polymers may have two or more vinyl aromatic hydrocarbon blocks, i.e. polystyrene blocks. These polymers should have a vinyl aromatic hydrocarbon content of less than 60% so that they are more compatible with asphalt and greater than 10% so that they will provide flow resistance at reasonable molecular weight. They should have molecular weights greater than 30,000 so that they improve flow resistance at low use levels and less than 1,000,000 so that they are compatible and readily mixable with asphalt. The 1,000,000 molecular weight limit refers to linear structures. Radial or star polymer with from three to fifty arms are also envisioned. Their uncoupled precursor should have a molecular weight below 500,000. After coupling, they could have a molecular weight of up to 50 times 500,000, or 25,000,000.

One class of preferred base polymers of the present invention are block copolymers of conjugated dienes, acrylic monomers such as alkyl methacrylates or their derivatives and vinyl aromatic hydrocarbons. Such block copolymers may be multiblock copolymers of varying structures containing various ratios of the monomers including those containing up to weight of vinyl aromatic hydrocarbon. At higher vinyl aromatic hydrocarbon contents, the polymers are not very compatible with bitumens. Thus, multiblock copolymers may be utilized which are linear or radial, symmetric or asymmetric, and which have structures represented by the formulae, ABAC, ABC, BC, BAC, CABAC, CBC, $(CB)_nX$, $(BC)_nX$, $(CB)_nXA_m$, $(BC)_nXA_m$, $(CB)_nXB_m$, $(BC)_nXB_m$, etc. where A is the vinyl aromatic hydrocarbon, B is the diene, C is the acrylic monomer, X is a coupling agent and n and m are integers from 1 to 50. These are just some of the structures possible. Their finite number is not meant to limit the scope of the invention. It is not necessary but B can be a polymer block of a conjugated diene that has been hydrogenated. As can be seen in the examples, hydrogenation of the diene is sometimes preferred.

It may be desirable to acid functionalize these block copolymers of methacrylate and rubber. However, the routes to acid functionalizing involve exposing the polymer to: (1) heat which eliminates isobutylene to form methacrylic acid, or (2), hydrolysis of the ester group by heating (70°-90° C.) a polymer solution in the presence of an acid or acid catalyst. Both routes can degrade and/or crosslink unsaturated rubber. To circumvent this problem the rubber block may be hydrogenated. An alternate route to acid functionalization of styrene-rubber copolymers is possible by sequentially polymerizing a segment of polymethacrylate onto one end of the styrene-rubber to make an "ABC" type polymer. The acid functionality can then be made in situ during the acid wash stage of catalyst removal.

Preferred polymers for use herein are block copolymers which contain a block of conjugated diene and a block of alkyl methacrylate because such polymers are more compatible in asphalt and improve the low temperature properties of asphalt as well as offering improved adhesion, reactivity, crosslinkability, etc.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. No. 5,002,676 and copending commonly assigned application Ser. No. 525,812, filed May 21, 1990, both of which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1, 3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 2,4-dimethylstyrene, alpha-methylstyrene, vinylnapthal vinylanthracene and the like. The preferred vinyl aromatic hydrocarbon is styrene.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and the like. Derivatives of alkyl methacrylates include methacrylic acid, methacrylic acid salts (for example, zinc, sodium and quaternary ammonium salts) and anhydrides formed between adjacent acid units by heating. It should be noted that derivatization of the methacrylate group can be carried out prior to adding the polymer to bitumen or in situ after the polymer is added to bitumen. Catalysts such as acids and bases can be added to aid the in situ conversion in asphalt. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., iso-butyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. It is also possible to copolymerize randomly or by sequential addition two or more different acrylic monomers in the acrylic monomer block. Tertiary butyl methacrylate (TBMA) is preferred because of ease of purification and polymerization, and because it undergoes thermolysis at temperatures as low as about 180° C.

High acrylic monomer content polymers and high molecular weight acrylic monomer blocks are also contemplated herein. Acrylic monomer contents of up to 80% or even as high as 99% and acrylic monomer block molecular weights up to 300,000 are envisioned. However, some acrylic monomers, such as TBMA, are presently expensive compared to monomers typically used commercially. Lower acrylic monomer contents, such as 1 to 30%, preferably 1 to 10%, and block molecular weights are advantageous at the present time, at least from a cost standpoint. As little as 0.1% of the acrylic monomer will provide the advantages of the invention but the results are better as the amount of acrylic monomer used is increased.

Acrylic monomer-containing polymers which do not improve the flow resistance of bitumen dramatically are of interest when combined with bitumen, or when combined with bitumen and other polymers (which provide the flow resistance; e.g., block copolymers of conjugated dienes and styrene which contain two or more styrene blocks, provided that they are effective at providing interfacial properties, or provided that they are crosslinked or reacted. Polymers which are easily crosslinked in asphalt are typically of high molecular weight so that less crosslinks per volume or weight of polymer are required. Furthermore, polymers which are easily crosslinked in asphalt and contain an acrylic monomer (or derivative) block include ones with many arms so that less crosslinks per volume or weight of polymer are required. Crosslinking can be carried out by conventional approaches such as sulfur or free radical or by reacting through methacrylate or methacrylate derivative groups.

Low molecular weight (less than 30,000 molecular weight) acrylic monomer-containing polymers are of interest for blending with asphalt when they are active at interfaces or when they are cured or reacted to form higher molecular weight polymers. Low molecular weight acrylic monomer-containing polymers are easily mixed into asphalt.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

For purposes of achieving the most useful crosslinking, it is preferred that the functionality in the polymer be localized. One example of a polymer with localized functionality is a vinyl aromatic hydrocarbon/diene/vinyl aromatic hydrocarbon/acrylic monomer block copolymer—all the functionality is at one end of the polymer (a specific example is the polymer used in Example 2 below). The localization of the functionality allows the production, by crosslinking, of a well defined star structure which will still be thermoplastic and processable. Randomly dispersed functionality, such as that of the polymer of Example 1 below, will, when crosslinked at the same levels, lead to a completely crosslinked system which is a thermoset.

A highly preferred polymer for use herein is a vinyl aromatic hydrocarbon/diene/acrylic monomer triblock copolymer. Crosslinking this polymer with a polyfunctional amine produces a radial structure with greatly enhanced properties—increased softening, decreased penetration and improved fatigue resistance.

The composition of the present invention generally comprises 100 parts by weight of a bituminous component and from 1 to 45 parts by weight per 100 parts of the composition of the polymer described above. If less than 1 part of the polymer of the invention is used, then the composition does not exhibit enhanced properties (increased softening point, decreased penetration and improved fatigue resistance). If more than 45 parts are used, the composition may be too high in viscosity depending upon the specific polymer structure. If more than 25 parts are used, the compositions may be too costly. However, the range of 25–40 parts polymer is of interest because often master batches are prepared at a manufacturing site and let down with additional bitumen later in the field.

The bituminous compositions of the present invention must contain from about 0.001 to about 1 part by weight of the composition of a polyfunctional amine having at least two amino groups. If less than 0.001 parts is used, then there is no benefit in enhancing compatibility and if more than 1 part is used, then the composition will be viscous to process. It is theorized that the amine reacts with both the functional groups on the polymer and the carboxyl groups on the asphaltenes, thereby linking the two phases together and making the mixture more stable. Thus, the bitumen and the polymer are made more compatible than they normally would be without the presence of the amine. Amine compounds which can be used herein include but are not limited to aromatic amines such as p-phenylenediamine, 2,4-diaminotoluene, benzidine, diaminonaphthalene, 2,7-diaminofluore methylenedianiline, aminophenylsulfone and dianilineether; aliphatic amines such as ethylenediamine, 1,2-diaminopropane, 1,3-diaminopropane, 1,4-diaminobutane, 1,5-diaminopentane, hexanediamine, diaminooctane, 1,9-diaminononane, 1,10-diaminodecane, 1,12-diaminododecane, 1,2-diaminocyclohexane, 1,4-diaminocyclohexane, 1,8-diamino-p-menthane, isophoronediamine, 1,3-cyclohexanebis(methylamine), m-xylylenediamine, 1,3-diamino-2-hydroxypropane, 3,3'-iminobispr methyldipropylamine, diethylenetriamine, triethylenetetrameine, tetraethylenepentamine, N,N'-bis(2-aminoethyl)-1,3-propanediamine, N,N'-bis(3-aminopropyl)ethylenediamine and 1,4polyamines such as tris(2-aminoethyl)amine. Secondary amines are acceptable but primary amines are preferred because they are more reactive and will form very stable imides. Aromatic amines are also acceptable but aliphatic amines are preferred because they are more reactive. Unhindered amines are preferred with $CH_2NH_2$ most preferred because they are more reactive. Other functionality can be present as long as it does not interfere with the grafting reaction. Acceptable groups are amines, amides, esters, hydroxyls, halogens, ethers, sulfones, aromatic rings, olefins, acetylenes, sulfides. These are exemplary, not limiting. High boiling (BP > 160° C.) amines are preferred for ease of addition and mixing. They may be liquid or solid at room temperature.

The compositions of the present invention may optionally include other ingredients like fillers such as ground tires or inorganic fillers like talc, calcium carbonate and carbon black. The composition may also include resins and oils and other components such as stabilizers. It may also include other polymers, for example, other polymers of conjugated diolefins.

Hot melt asphalt concrete compositions according to the present invention are especially advantageous. Hot melt asphalt concrete compositions according to the present invention will normally contain from 80 parts to 99 parts by weight of aggregate and from 1 part to 20 parts of a bituminous composition which is generally comprised of 85 to 99 parts by weight per 100 parts of the bituminous composition of a bituminous component and from 1 part to 15 parts by weight per 100 parts of the bituminous composition of one of the polymers discussed above. The same amount of amine is used to provide the advantages discussed above. If less than 1 part of the polymer is used, then improved adhesion between bitumen and aggregate is not obtained and if more than 15 parts of the polymer is used, then the composition is too costly and high in viscosity. Asphalts with good flow resistance prior to polymer addition are preferred at very low polymer concentrations because at very low polymer concentrations the polymer does not contribute strongly to other properties such as deformation resistance, i.e. rutting resistance. In other words, at low polymer concentrations, asphalts with good rutting resistance on their own are preferred. The bituminous composition may optionally include other ingredients such as fillers, such as ground tires or inorganic fillers. The composition may also include resins and oils and stabilizers. It may also include other polymers, for example, non-functionalized polymers of conjugated diolefins.

Aggregate is basically rocks and sand. It is intended to be mixed with the bituminous composition to form the hot mix asphalt concrete. The bituminous composition is the binder which holds the aggregate together.

In using the bituminous composition of the present invention in hot melt asphalt concrete, it is preferred that these polymers comprise from 1 to 8 parts by weight per hundred parts by weight of the bituminous composition. However, if it is desired to achieve the maximum anti-stripping results in the most cost effective manner, it is most preferred that the polymers comprise from 1 to 4 parts by weight per hundred parts by weight of the bituminous composition.

Roofing compositions according to the present invention are also especially advantageous. In roofing compositions designed for roll roofing membranes a composition of 85-92 parts asphalt and 8-15 parts polymer is preferred. A composition of 87-90 parts asphalt and 10-13 parts polymer is most preferred. As with HMAC compositions other additives such as inorganic fillers, resins, oils, and stabilizers may be added.

Similar compositions may be used for laminating adhesives and tab adhesives. For laminating or tab adhesives a composition of 90-96 parts asphalt and 4-10 parts polymer is preferred.

EXAMPLE 1

Anhydride Modified Polymer

Four bitumen/polymer blends were made. The blends contained 88% asphalt, 10% unfunctionalized unhydrogenated polymer (KRATON®D1101 rubber which is a commercially available unhydrogenated linear styrene-butadiene-styrene block copolymer) and 2% KRATONOG1901X rubber (a commercially available selectively hydrogenated styrene-butadiene-styrene block copolymer containing approximately 1.8% weight grafted maleic anhydride). Two of the blends were made with WR AC20, an asphalt made by Shell Oil Company at its Deer Park, Texas Refinery, and the other two blends were made with DS AC20, an asphalt made by Diamond Shamrock. For each asphalt, 0.07 parts of m-xylylene diamine was added to only one of the two blends.

The compatibility of the blends were then compared by determining the percent separation. This was carried out by aging samples under nitrogen at 1600° C. for five days. After cooling, a clear phase separation into a soft, rubbery polymer-rich phase and a hard, glassy asphaltene phase was typically observed.

When the WRC AC20 blend without the amine was tested, the asphaltene phase comprised approximately 45% of the total but when the amine was added, the asphaltene phase comprised only about 1-2% of the total. Similarly, for the DS AC20 asphalt, without the amine the asphaltene phase was approximately 45% and with the amine, the asphaltene phase was only about 15%. Thus, it can be seen that the amine does have a substantial impact upon the compatibility of the bitumen/polymer blend.

EXAMPLE 2

Tertiary Butyl Methacrylate Polymer

The asphalt used in this experiment was WRC AC20. The tertiary butyl methacrylate (TBMA) polymer used herein was a linear styrene (15,000 molecular weight)—butadiene (70,000 MW)—styrene (7500 MW)—TBMA (5,000 MW) block copolymer.

Four blends, all containing 12 parts by weight polymer, were prepared. The first contained KRATON® D1101 rubber as described above. The second contained the above-described TBMA block copolymer. The third contained the above TBMA polymer to which 0.08 parts of m-xylenediamine was added. In the fourth blend, the amine was added to the asphalt before the TBMA polymer was added.

The physical properties of the four blends were determined and are compared in the table set forth below. Compatibility was determined as described above. Pen was determined by ASTM D-5 and is a measure of the hardness of the blend. The 1600° C. viscosity was measured on a Brookfield viscometer (ASTM D-4402) and is important because this is a typical processing temperature and an appropriate viscosity is required. R&B is ring and ball softening point (ASTM D-36).

| tBMA POLYMERS | | | | |
|---|---|---|---|---|
| Polymer tested in WR AC20 at 12% | S---B---S---M 15 70 7.5 5 | | | |
| | R&B | pen | Compat | 160° C. vis |
| D1101 | 230 | 28 | 57 | 4350 |
| tBMA | 210 | 32 | 100 | 5300 |
| tBMA than amine | 221 | 30 | 100 | 5700 |
| amine then tBMA | 219 | 32 | 93 | 4800 |

It can be seen that all of the TBMA blends are far superior in compatibility to the unhydrogenated unfunctionalized polymer. Also, it can be seen that, while the pen and 1600 viscosities are comparable, the two TBMA samples including the amine had a higher R&B than the TBMA sample without the amine.

We claim:

1. A bituminous composition comprising a bituminous component; a polymer comprising at least one conjugated diolefin block and at least one acrylic monomer block with the structure

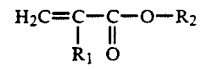

wherein $R_1$ is selected from the group consisting of hydrogen, phenyl and alkyl radicals which are linear or branched and contain from 1 to 10 carbon atoms, and $R_2$ is a cyclic or non-cyclic alkyl radical which contains from 1 to 14 carbon atoms and may contain a tertiary amine or an ether linkage; and from 0.001 parts to 1 part by weight of the composition of a polyfunctional amine having at least two amino groups.

2. The composition of claim 1 wherein the polymer also comprises at least one block of a vinyl aromatic hydrocarbon.

3. The composition of claim 2 wherein the acrylic monomer is an alkyl methacrylate or acrylate.

4. The composition of claim 3 wherein the acrylic monomer is tertiary butyl methacrylate.

5. The composition of claim 1 wherein the polymer comprises from 1 part to 45 parts by weight of the bituminous composition.

6. The composition of claim 3 wherein the acrylic monomer is a hydrolyzed alkyl methacrylate or acrylate or an anhydride derivative.

7. The composition of claim I wherein the polymer is selectively hydrogenated.

8. The composition of claim 1 wherein the polymer contains at least 0.1% of the acrylic monomer.

9. The composition of claim 8 wherein the polymer contains from 1% to 10% of the acrylic monomer.

10. A hot melt asphalt concrete composition comprising:
(a) from 80 parts to 99 parts by weight of aggregate, and
(b) from 1 part to 20 parts by weight of the bituminous composition of claim 1.

11. The hot melt asphalt concrete composition of claim 10 wherein the bituminous composition is comprised of:
(a) from 85 parts to 99 parts by weight per 100 parts of the bituminous composition of the bituminous component, and
(b) from 1 part to 15 parts by weight per 100 parts of the bituminous composition of the polymer.

12. The hot melt asphalt concrete composition of claim 11 wherein the polymer comprises from 1 part to 8 parts by weight per hundred parts by weight of the bituminous composition.

13. The hot melt asphalt concrete composition of claim 12 wherein the polymer comprises from 1 part to 4 parts by weight per hundred parts by weight of the bituminous composition.

14. A bituminous adhesive composition comprising the bituminous composition of claim 1.

15. The bituminous composition of claim 17 wherein the polymer comprises from 4 to 10 parts per 100 parts of the bituminous composition.

16. A bituminous composition comprising a bituminous component; an acid or anhydride functionalized block polymer comprising at least one conjugated diolefin block; and from 0.001 parts to 1 part by weight of the composition of a polyfunctional amine having at least two amino groups.

17. The composition of claim 16 wherein the polymer also comprises at least one block of a vinyl aromatic hydrocarbon.

18. The composition of claim 16 wherein the polymer has grafted thereon at least one monomer selected from the group consisting of carboxylic acid groups and their salts, anhydrides, esters, imide groups, acid chlorides and sulfonic acid groups.

19. The composition of claim 16 wherein the polymer comprises from 1 part to 45 parts by weight of the bituminous composition.

20. The composition of claim 16 wherein the polymer contains at least 0.2% of the acid or anhydride functional groups.

21. The composition of claim 20 wherein the polymer contains from 0.5% to 3% of the acid or anhydride functional groups.

22. A hot melt asphalt concrete composition comprising:
(a) from 80 parts to 99 parts by weight of aggregate, and
(b) from 1 part to 20 parts by weight of the bituminous composition of claim 16.

23. The hot melt asphalt concrete composition of claim 22 wherein the bituminous composition is comprised of:
(a) from 85 parts to 99 parts by weight per 100 parts of the bituminous composition of the bituminous component, and
(b) from 1 part to 15 parts by weight per 100 parts of the bituminous composition of the polymer.

24. The hot melt asphalt concrete composition of claim 23 wherein the polymer comprises from 1 part to 8 parts by weight per hundred parts by weight of the bituminous composition.

25. The hot melt asphalt concrete composition of claim 24 wherein the polymer comprises from 1 part to 4 parts by weight per hundred parts by weight of the bituminous composition.

26. A bituminous adhesive composition comprising the bituminous composition of claim 16.

27. The bituminous composition of claim 26 wherein the polymer comprises from 4 to 10 parts per 100 parts of the bituminous composition.

28. The composition of claim 1 wherein the functionality in the polymer is localized.

29. The composition of claim 28 wherein the polymer is a vinyl aromatic hydrocarbon/diene/acrylic monomer triblock polymer.

30. The composition of claim 16 wherein the functionality in the polymer is localized.

31. The composition of claim 30 wherein the polymer is a vinyl aromatic hydrocarbon/diene/acrylic monomer triblock polymer.

* * * * *